US009906352B2

(12) United States Patent
Tong et al.

(10) Patent No.: US 9,906,352 B2
(45) Date of Patent: Feb. 27, 2018

(54) UPLINK AND DOWNLINK SLOT TIME RESOURCE CONFIGURATION METHOD BASED ON INTERFERENCE PERCEPTION IN TIME DIVISION DUPLEX SYSTEM

(71) Applicant: SHANGHAI RESEARCH CENTRE FOR WIRELESS COMMUNICATIONS, Shanghai (CN)

(72) Inventors: Xiao Tong, Shanghai (CN); Jiang Wang, Shanghai (CN); Tao Peng, Shanghai (CN); Jing Xu, Shanghai (CN); Yong Teng, Beijing (CN); Horneman Kari, Oulu (FI)

(73) Assignee: SHANGHAI RESEARCH CENTRE FOR WIRELESS COMMUNICATIONS, Changning District, Shanghai (CN)

( * ) Notice: Subject to any disclaimer, the term of this patent is extended or adjusted under 35 U.S.C. 154(b) by 319 days.

(21) Appl. No.: 14/761,609

(22) PCT Filed: Dec. 19, 2013

(86) PCT No.: PCT/CN2013/089910
§ 371 (c)(1),
(2) Date: Jul. 16, 2015

(87) PCT Pub. No.: WO2014/101704
PCT Pub. Date: Jul. 3, 2014

(65) Prior Publication Data

US 2016/0020893 A1 Jan. 21, 2016

(30) Foreign Application Priority Data

Dec. 25, 2012 (CN) .......................... 2012 1 0572221

(51) Int. Cl.
*H04L 5/14* (2006.01)
*H04W 72/08* (2009.01)
(Continued)

(52) U.S. Cl.
CPC ............. *H04L 5/14* (2013.01); *H04B 17/345* (2015.01); *H04L 5/0073* (2013.01);
(Continued)

(58) Field of Classification Search
CPC .. H04W 72/0406; H04W 72/10; H04W 88/10
(Continued)

(56) References Cited

U.S. PATENT DOCUMENTS 6,097,709 A * 8/2000 Kuwabara ............ H04B 7/2696 370/331
2011/0177815 A1* 7/2011 Jeong .................... H04W 48/14 455/436

(Continued)

FOREIGN PATENT DOCUMENTS

CN 101867967 A 10/2010
CN 101873686 A 10/2010

(Continued)

*Primary Examiner* — Jae Y Lee
*Assistant Examiner* — Jean F Voltaire
(74) *Attorney, Agent, or Firm* — Global IP Services; Tianhua Gu

(57) ABSTRACT

The invention provides an uplink and downlink slot time resource configuration method based on interference perception in a TDD system, which is applied to a communication network comprising a source base station, a target base station, as well as a user terminal in the source base station and a user terminal in the target base station, and the method comprises: judging whether the base station-to-base station interference is larger than a preset threshold value or not, if yes, canceling the uplink and downlink slot time resource configuration, and if no, continuously executing the (Continued)

next step; judging whether the interference measurement of the target base station on the user terminal in the source base station is larger than a preset threshold value or not, if no, executing the uplink and downlink slot time resource configuration, and if yes, executing the next step; judging whether the interference measurement of the source base station on the user terminal in the target base station is larger than a preset threshold value or not, if yes, canceling the uplink and downlink slot time resource configuration, and if no, executing the uplink and downlink slot time resource configuration. By the information interaction between the base stations, the flexible configuration of uplink and downlink slot time resources is realized, and the crossing slot time interference problem brought by the flexible configuration of the uplink and downlink slot time resources in different network structures is solved.

9 Claims, 6 Drawing Sheets

(51) Int. Cl.
*H04B 17/345* (2015.01)
*H04L 5/00* (2006.01)
*H04W 72/04* (2009.01)
*H04B 7/26* (2006.01)
*H04W 24/10* (2009.01)

(52) U.S. Cl.
CPC ..... *H04W 72/0446* (2013.01); *H04W 72/082* (2013.01); *H04B 7/2643* (2013.01); *H04B 7/2656* (2013.01); *H04W 24/10* (2013.01); *H04W 72/0406* (2013.01)

(58) Field of Classification Search
USPC .......................................................... 370/280
See application file for complete search history.

(56) References Cited

U.S. PATENT DOCUMENTS

2014/0022966 A1* 1/2014 Parkvall ............... H04B 7/2656 370/280
2015/0163815 A1* 6/2015 Lei ........................ H04W 16/10 370/280

FOREIGN PATENT DOCUMENTS

CN 102457912 A 5/2012
CN 103068050 A 4/2013

* cited by examiner

UPLINK AND DOWNLINK SLOT TIME RESOURCE CONFIGURATION METHOD BASED ON INTERFERENCE PERCEPTION IN TIME DIVISION DUPLEX SYSTEM

CROSS REFERENCE TO RELATED PATENT APPLICATION

The present application is the US national stage of PCT/CN2013/089910 filed on Dec. 19, 2013, which claims the priority of the Chinese patent applications No. 201210572221.7 filed on Dec. 25, 2012, which applications are incorporated herein by reference.

BACKGROUND OF THE PRESENT INVENTION

Field of the Invention

The invention belongs to the technical field of wireless communication, and relates to an uplink and downlink slot time resource configuration method, in particular to an uplink and downlink slot time resource configuration method based on interference perception in a TDD system.

Description of Related Arts

In order to avoid the interference problem brought by flexible slot time configuration, the traditional LTE TDD (Long Term Evolution Time Division Duplexing) network adopts a method of synchronous slot time configuration for each cell, and on the whole network, the TDD uplink and downlink slot time resource configuration is identical. Along with the development of a wireless communication technology, in the future heterogeneous network, the service asymmetry feature of each cell is increasingly obvious, and the same uplink and downlink slot time resource configuration cannot adapt to the service requirements of the network, which results that the resource use ratio of the system is low.

In a single cell (without same frequency interference) scene, the configuration of uplink and downlink resources can be self-adaptively changed according to the need of transmission business, the use ratio of slot time resources is improved and the interference problem of crossing slot time does no need to be considered.

In the deployment of multiple cell TDD (with same frequency interference) systems, although the self adaptivity of the system for transmission business is improved, extra interference types (base station-to-base station interference and terminal-to-terminal interference) are generated in the meanwhile. As shown in FIG. 1 and FIG. 2, it is necessary to effectively evaluate the crossing slot time interference between the cells. The crossing slot time interference comprises base station-to-base station interference and terminal-to-terminal interference, which may severely influence the performance of the whole network, therefore, for the uplink and downlink slot time flexible configuration of the TDD system, the influence on the system performance caused by the crossing slot time interference needs to be solved.

In a document of "An Effective Dynamic Slot Allocation Strategy Based on Zone Division in WCDMA/TDD Systems", a solution for matching the transmission asymmetry of cell business by dynamically adjusting the uplink and downlink slot time resources in the WCDMA/TDD system is provided, and in this scheme, the coverage of each cell is divided into two zones (an internal zone and an external zone). Wherein, dynamic slot time allocation is only adaptive to the internal zone because of the smaller interference of the crossing slot time of the internal zone on an adjacent cell; in the external zone, all cells keep the same slot time configuration. However, the resource allocation method in the prior art has defects as follows:

1, the slot time resources can not be fully used because the external zone needs to keep a same slot time configuration, and the effect of flexible configuration of the TDD slot time cannot be fully developed;

2, different zones of the same cell need different slot time configuration, which are not compatible with the current standards;

3, the zone division and resource allocation process needs massive calculation, which increases the system burden;

4, in a heterogeneous network, small cells (such as micro cells and family base stations) are difficultly in being divided into different zones, thus the effective dynamic slot time allocation method based on partition on the WCDMA/TDD system is not adaptive anymore.

SUMMARY OF THE PRESENT INVENTION

In view of the defects in the prior art, the invention aims to provide an uplink and downlink slot time resource configuration method based on interference perception in a TDD (time division duplex) system, which is used for solving the problem of the crossing slot time interference caused by the uplink and downlink slot time resource configuration existing in different network structures in the prior art.

In order to achieve the aim and other related aims, the invention provides an uplink and downlink slot time resource configuration method based on interference perception in a TDD (time division duplex) system. The method is applied to a communication network comprising a source base station, a target base station, as well as a user terminal in the source base station and a user terminal in the target base station, and the uplink and downlink slot time resource configuration method comprises:

S1, judging interference 1, namely whether the interference between the source base station and the target base station is larger than a preset threshold value or not, if yes, canceling the uplink and downlink slot time resource configuration, and if no, continuously executing the next step;

S2, judging interference 2, namely, whether the interference measurement of the target base station on the user terminal in the source base station is larger than a preset threshold value or not, if no, executing the uplink and downlink slot time resource configuration; if yes, sending an interference exchange request signaling to the target base station from the source base station, and continuously executing the next step;

S3, after the target base station receives the interference exchange request signaling, inspecting the interference measurement of the user terminal in the target base station, finding out the interference information of the user terminal in the target base station which is interfered by the source base station to the greatest extent, arranging the greatest interference information in an interference exchange response signaling to send back to the source base station, inspecting the received interference exchange response signaling by the source base station, judging interference 3, namely, whether the interference measurement of the source base station on the user terminal in the target base station is larger than a preset threshold value or not, if yes, canceling the uplink and downlink slot time resource configuration, and if no, executing the uplink and downlink slot time resource configuration.

Preferably, when the source base station is changed to uplink slot time resource configuration from downlink slot time resource configuration, the step S1 also comprises: estimating the interference of the target base station on the source base station by the source base station according to a reference signal receiving power measurement report per se.

Preferably, when the source base station is changed to downlink slot time resource configuration from uplink slot time resource configuration, the step S1 also comprises: performing interference prediction of the source base station on adjacent cells by the source base station according to the interference information received in an establishing process of ANR (Auto Neighbor Relationship).

Preferably, the step S2 also comprises:

measuring the interference received from the target base station by the user terminal in the source base station, then reporting the received interference to the source base station; and judging whether the interference on the user terminal in the source base station from the target base station is larger than a preset threshold value or not, if no, executing the uplink and downlink slot time resource configuration, if yes, indicating that the user terminal in the source base station is a cell edge user, sending an interference exchange request signaling to the target base station by the source base station, and notifying the target base station to start the interference measurement of the user terminal in the target base station.

Preferably, the step S3 also comprises:

after the target base station receives the interference exchange request signaling, inspecting the interference measurement of the user terminal in the target base station, finding out the interference information of the user terminal in the target base station which is interfered by the source base station to the greatest extent, and arranging the greatest interference information in the interference exchange response signaling to send back to the source base station; and inspecting the received interference exchange response signaling by the source base station, judging whether the maximal interference of the source base station on the user terminal in the target base station is larger than a preset threshold value or not, if yes, indicating that the user terminal in the source base station and the user terminal in the target base station are both cell edge uses, the user terminal in the source base station and the user terminal in the target base station are adjacent users between different cells, and the interference of the user terminal in the source base station on the user terminal in the target base station is severer, thus canceling the uplink and downlink slot time resource configuration; if no, executing the uplink and downlink slot time resource configuration.

Preferably, the interference exchange request signaling and the interference exchange response signaling are used for estimating the interference between the user terminals.

Preferably, the source base station is a base station triggering the uplink and downlink reconfiguration, and the target base station is an interfered base station.

Preferably, when at least one user terminal exists in the source base station, the user terminal is called as an edge user terminal and when the edge user terminal is severely interfered by the target base station, the source base station sends the interference exchange request signaling to the target base station.

Preferably, the interference exchange request signaling has two options of: 1, marking whether a severely interfered user terminal exists in the target base station by an interference zone bit; and 2, notifying the target base station to feed back the maximal interference information from the source base station.

Preferably, the target base station sends an interference exchange response signaling to the source base station according to the interference exchange request signaling option.

As mentioned above, the uplink and downlink slot time resource configuration method based on interference perception in a TDD (time division duplex) system has the following beneficial effects:

1, realizing the uplink and downlink slot time resource configuration by the information interaction between the base stations, improving the system throughput capacity, reducing interference of edge users, ensuring the maximal resource use ratio and reducing the signaling complexity;

2, solving the problem of crossing slot time interference caused by the flexible configuration of uplink and downlink resources existing in the different network structures, namely the heterogeneous network and the homogeneous network.

DETAILED DESCRIPTION OF THE PREFERRED EMBODIMENTS

Figure 1:
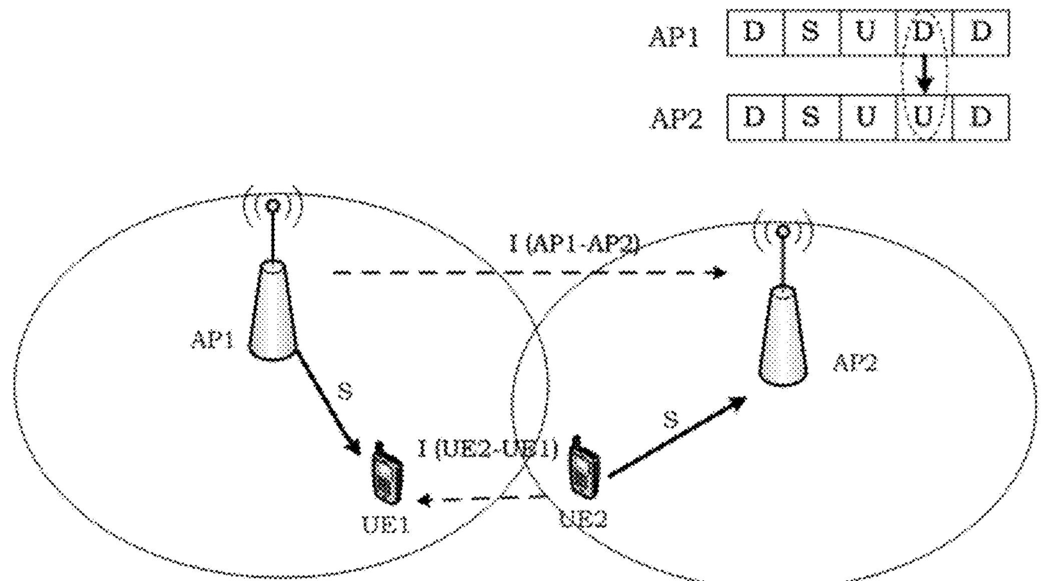
FIG. 1 is a first scene schematic diagram of base station-to-base station interference and terminal-to-terminal interference.
Figure 2:
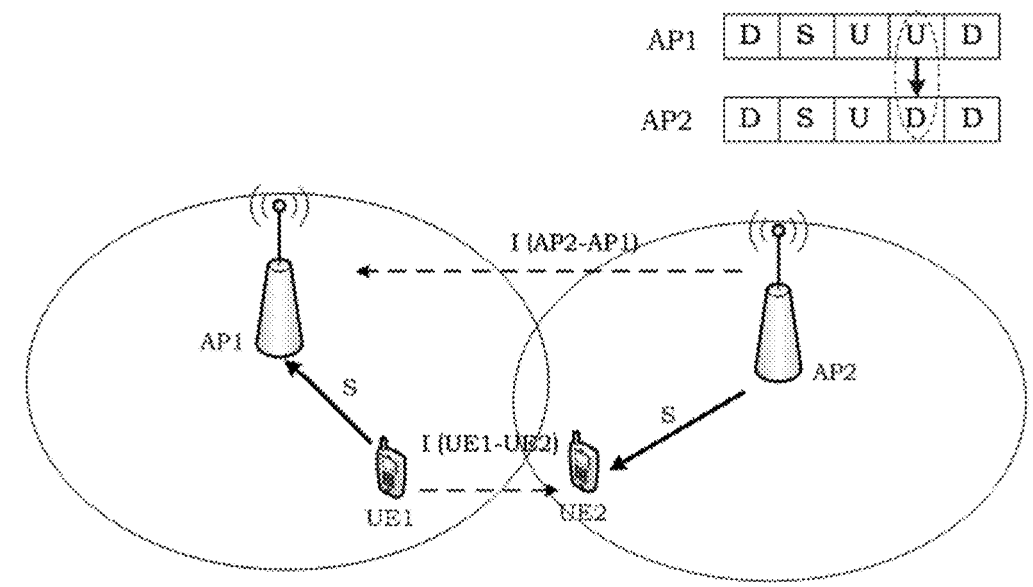
FIG. 2 is a second scene schematic diagram of base station-to-base station interference and terminal-to-terminal interference.

The embodiments of the invention are described by following specific examples, and those skilled in the art can easily learn other advantages and effects of the invention by the description. The invention can also be implemented or applied by other different specific embodiments, all details in the description can also be modified or changed based on different opinions and applications without departing from the spirit of the invention.

Reference is made to Figures. It should be explained that the diagrams provided in the embodiments aim to explain the basic concept of the invention in a schematic way only, thus only related assemblies in the invention are displayed in the diagrams without drawing according to assembly number and shape and size drawing in actual implementation, the shape, number and ratio of each assembly can be randomly changed in actual implementation, and the assembly layout pattern may be more complicated.

In combination with the embodiments and Figures, the invention is clearly and completely described:

The invention is applied to a mobile wireless communication system, for example, the long term evolution and short term evolution of 3GPP (The 3rd Generation Partnership Project). In RAN (Residential Access Network) #51 of the third cooperation partner plan (3GPP), Rel-11 (version 11) of LTE (Long Term Evolution) puts forward a new research direction "further enhancement technology for LTE TDD uplink and downlink interference management and business transmission self adaptivity". In the research direction, the potential advantages of the uplink and downlink slot time resource configuration technology in the TDD system are mainly analyzed, and the technology challenge mainly comes from the problem of how to perform effective interference management under the uplink and downlink flexible configuration conditions.

The embodiments of the invention provide an uplink and downlink slot time resource configuration method based on interference perception in a time division duplex system, the uplink and downlink slot time resource configuration method comprises two levels: 1, base station-to-base station interference measurement, wherein the second level is triggered only when the base station-to-base station interference is smaller than a preset threshold value; 2, user terminal-to-user terminal interference estimation. The embodiments redefine two special signals, namely, an interference exchange request signaling and an interference exchange response signaling, and the special signals are used for evaluating the terminal-to-terminal interference. Only when the terminal-to-terminal interference is judged to be small enough, different configurations of the uplink and downlink slot time resources can be executed.

In the invention, the base station for triggering the uplink and downlink reconfiguration is called as a source base station, and an interfered base station is called as a target base station.

When at least one user terminal exists in the source base station, the user terminal is called as an edge user terminal and when the edge user terminal is severely interfered by the target base station, the source base station sends the interference exchange request signaling to the target base station. The interference exchange request signaling can have two options of:

1, marking whether a severely interfered user terminal exists in the target base station by an interference zone bit, namely the interference exceeds the preset threshold value;

2, notifying the target base station to feed back the maximal interference information from the source base station. The target base station sends the interference exchange response signaling to the source base station according to the interference exchange request signaling option. The interference exchange response signaling feeds back the interference zone bit information or the greatest interference information of the source base station on the user terminal in the target base station. If the interference of the source base station on the user terminal in the target base station is severe, namely, the interference exceeds the threshold value, the uplink and downlink slot time reconfiguration of the source base station is cancelled or the source base station schedules the edge user terminal to not use the crossing slot time.

Herein two scenes are designed:

Scene 1, the source base station is changed to uplink slot time resource configuration from downlink slot time resource configuration For the interference between the base stations, the source base station measures, evaluates and acquires the interference from the target base station by a downlink receiver thereof.

For the interference measurement evaluation between the user terminals, the invention is based on first aspect: the interference measurement of the target base station on the interference source user terminal in the source base station, and second aspect: the interference measurement of the source base station on the interfered user terminal in the target base station.

Scene 2: the source base station is changed to downlink slot time resource configuration from uplink slot time resource configuration For the interference between the base stations, the source base station predicts the interference to adjacent base stations during the slot time configuration change of the source base station based on input interference measured in the establishing process of ANR (Auto Neighbor Relationship).

For the interference measurement evaluation between the user terminals, the invention is based on two aspects of 1, the interference measurement of the target base station on the interfered user terminal in the source base station, and 2, the interference measurement of the source base station on the interference source user terminal in the target base station.

Figure 3:
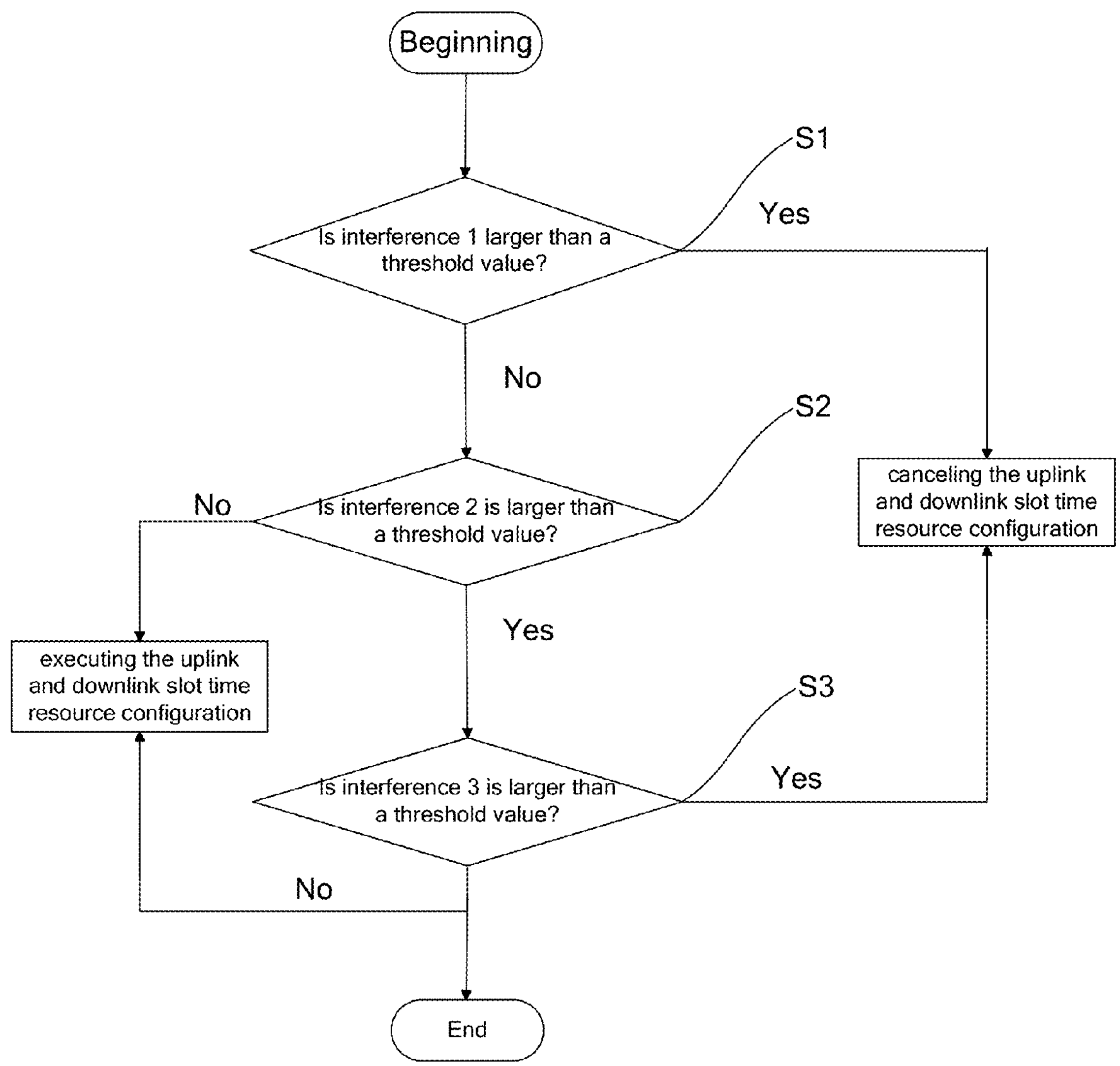
FIG. 3 is a flow diagram of an uplink and downlink slot time resource configuration method based on interference perception in a time division duplex system of the invention.

Based on the two scenes, before the uplink and downlink slot time resource configuration method based on interference perception is executed, the counting on uplink and downlink business requirements by each base station also needs to be executed, whether the requirement change is larger than a preset threshold value, if no, the uplink and downlink slot time resource configuration method based on interference perception is not execute, if yes, the uplink and downlink slot time resource configuration process is started, the execution process of the uplink and downlink slot time resource configuration method based on interference perception is entered, and as shown in FIG. 3, the uplink and downlink slot time resource configuration method based on interference perception comprises:

S1, judging whether the interference between the source base station and the target base station is larger than a preset threshold value or not, if yes, canceling the uplink and downlink slot time resource configuration, and if no, continuously executing the next step, wherein the interference between the source base station and the target base station is set to be interference 1.

S2, judging whether the interference measurement of the target base station on the user terminal in the source base station is larger than a preset threshold value or not, if no, executing the uplink and downlink slot time resource configuration; if yes, sending an interference exchange request signaling to the target base station from the source base station, and continuously executing the next step, wherein the interference of the target base station on the user terminal in the source base station is interference 2.

S3, after the target base station receives the interference exchange request signaling, inspecting the interference measurement of the user terminal in the target base station, finding out the interference information of the user terminal in the target base station which is interfered by the source base station to the greatest extent, arranging the greatest interference information in an interference exchange response signaling to send back to the source base station, inspecting the received interference exchange response signaling by the source base station, judging whether the interference measurement of the source base station on the user terminal in the target base station is larger than a preset threshold value or not, if yes, canceling the uplink and downlink slot time resource configuration, if no, executing the uplink and downlink slot time resource configuration, wherein the interference of the source base station on the user terminal in the target base station is interference 3.

The uplink and downlink slot time resource configuration method based on interference perception can solve the crossing slot time interference problem brought by the flexible configuration of the uplink and downlink slot time resources in different network structures.

Figure 4:
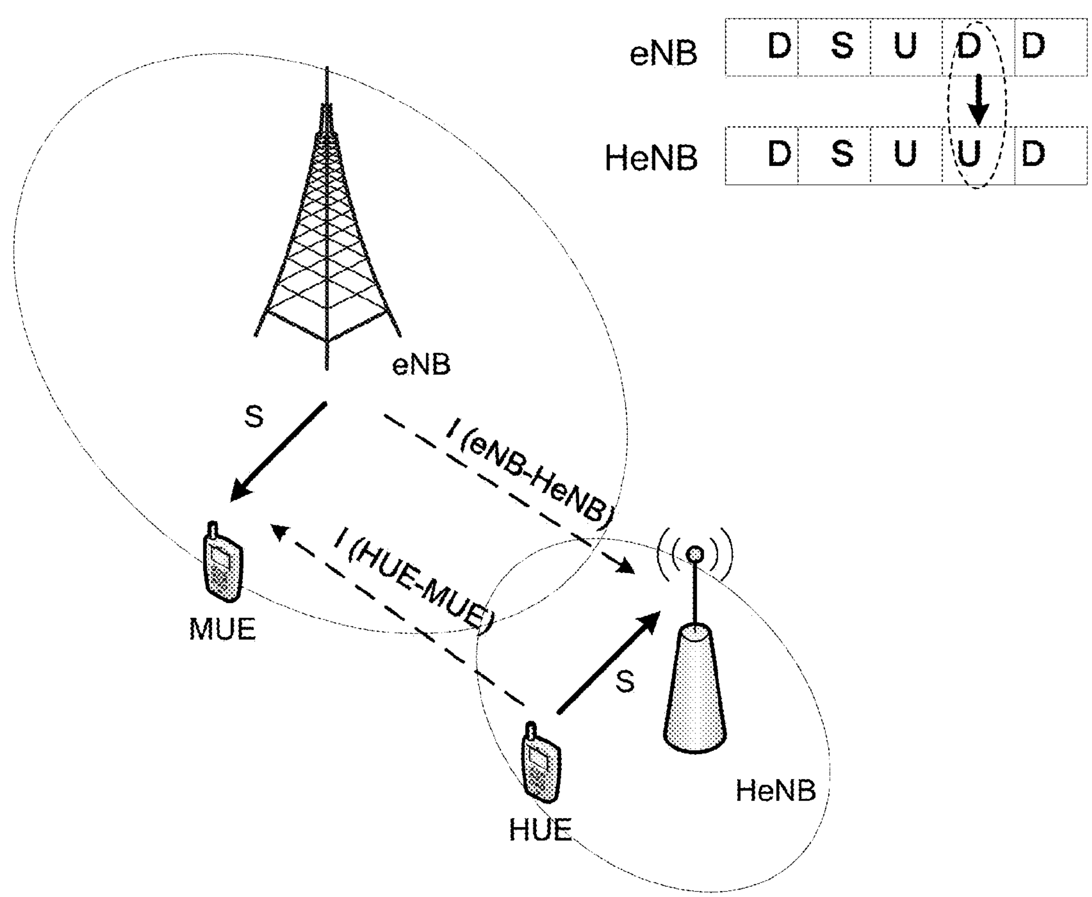
FIG. 4 is a scene diagram that the source base station is changed to uplink slot time resource configuration from downlink slot time resource configuration in the uplink and downlink slot time resource configuration method based on interference perception in a time division duplex system of the invention.

The uplink and downlink slot time resource configuration method based on interference perception is applied into two specific scenes, and the execution steps of the method will be discussed in detail as follows:

In present embodiments, HeNB is family base station, eNB is macro base station, HUE is user terminal in the family base station, and MUE is user terminal in the macro base station. FIG. 4 shows the scene diagram that the HeNB is changed to uplink slot time resource configuration from downlink slot time resource configuration, the scene diagram gives different uplink and downlink slot time resource configurations during coexisting of macro base station and family base station. In the scene, it also needs to consider the interference of eNB to HeNB and the interference of HUE to MUE.

Figure 5:
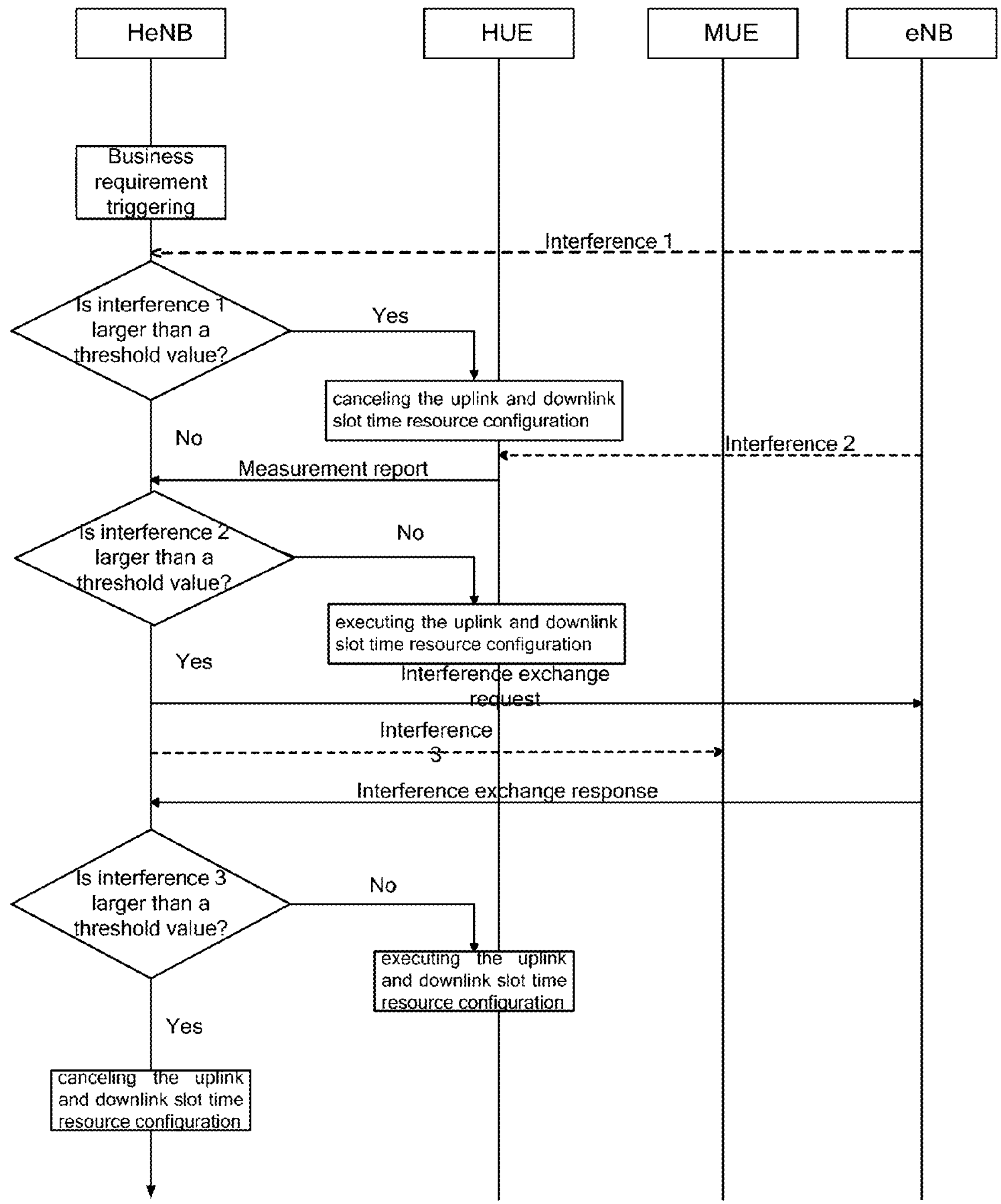
FIG. 5 is a schematic diagram of execution steps that the source base station is changed to uplink slot time resource configuration from downlink slot time resource configuration in the uplink and downlink slot time resource configuration method based on interference perception in a time division duplex system of the invention.

Therefore, in the scene 1 as shown in FIG. 4, the HeNB is changed to uplink slot time resource configuration from downlink slot time resource configuration, wherein, the HeNB is source base station, eNB is target base station, and the uplink and downlink slot time resource configuration method based on interference perception is executed according to execution steps as shown in FIG. 5:

S1, judging whether the interference of eNB on HeNB is larger than a preset threshold value or not, if yes, canceling the uplink and downlink slot time resource configuration, and if no, continuously executing S2, wherein HeNB estimates the interference of eNB on HeNB according to an RSRP (Reference Signal Receiving Power) measurement report.

S2, judging the interference of eNB on HUE in HeNB, if the interference is smaller than a preset threshold value, executing the uplink and downlink slot time resource configuration; if the interference is not smaller than a preset threshold value, continuously executing S3, wherein the step also comprises:

measuring the interference received from the eNb by HUE, and then reporting the received interference measurement to the HeNB; and judging the interference measurement report to eNB from HUE by HeNB, if the interference measured by HUE is smaller than a preset threshold value, executing the uplink and downlink slot time resource configuration by the HeNB; if the interference measured by HUE is not smaller than a preset threshold value, indicating that HUE is a cell edge user, thus sending an interference exchange request signaling to eNB from the HeNB, and notifying the eNB to start the interference measurement about MUE.

S3, judging whether the interference of HeNB on MUE in eNB is larger than a preset threshold value, if yes, canceling the uplink and downlink slot time resource configuration; if no, executing the uplink and downlink slot time resource configuration. The step also comprises:

after eNB receives the interference exchange request signaling, inspecting the interference measurement of the user terminal in the cell, finding out the greatest interference information of MUE which is interfered by HeNB to the greatest extent, arranging the greatest interference information in the interference exchange response signaling to send back to HeNB; and inspecting the received interference exchange response signaling by HeNB, judging whether the greatest interference of HeNB on MUE is larger than a preset threshold value, if yes, indicating that HUE and MUE are both cell edge users, and HUE and MUE are adjacent users between different cells, and the interference of HUE on MUE is severer, thus canceling the uplink and downlink slot time resource configuration; otherwise, executing the uplink and downlink slot time resource configuration. The interference exchange request signaling and the interference exchange response signaling are used for estimating the interference between the user terminals. S2 and S3 are used for judging the terminal-to-terminal interference, and different configurations of uplink and downlink slot time resources can be executed only when the terminal-to-terminal is judged to be small enough.

Figure 6:
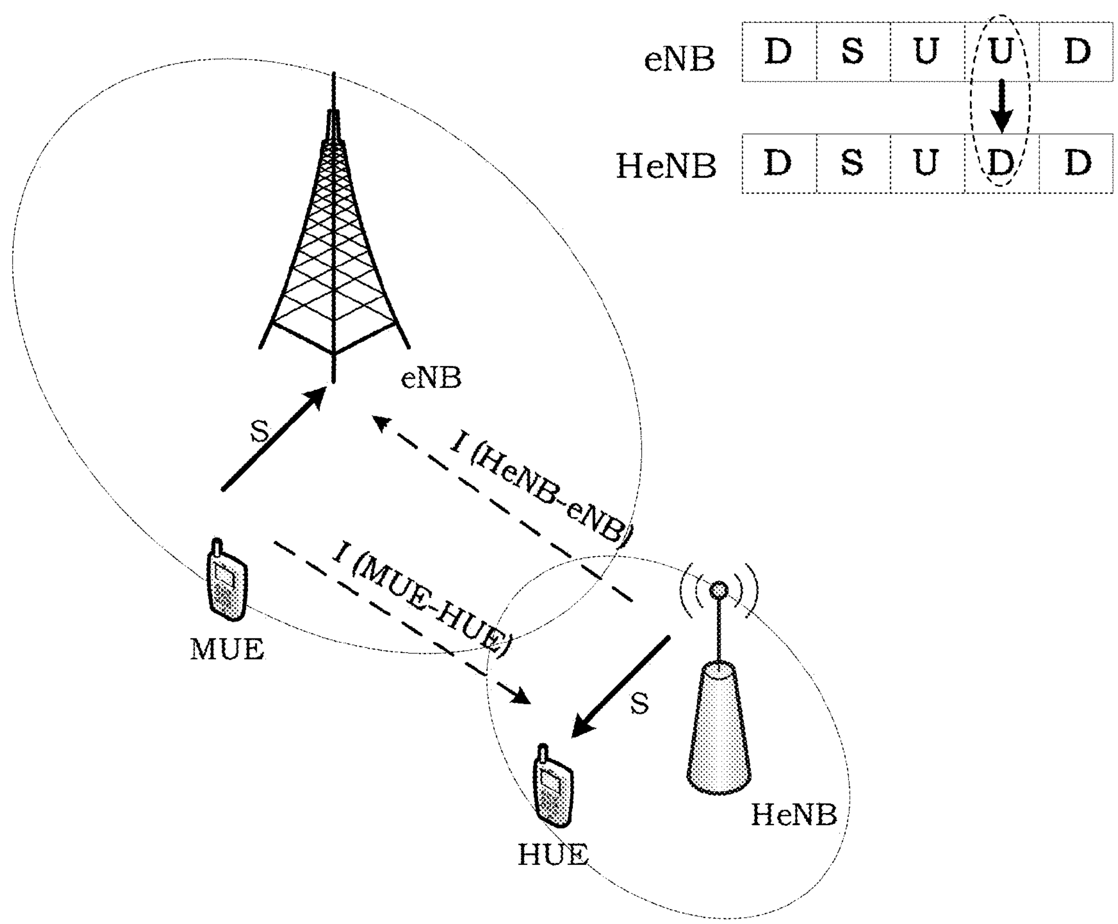
FIG. 6 is a scene diagram that the source base station is changed to downlink slot time resource configuration from uplink slot time resource configuration in the uplink and downlink slot time resource configuration method based on interference perception in a time division duplex system of the invention.
Figure 7:
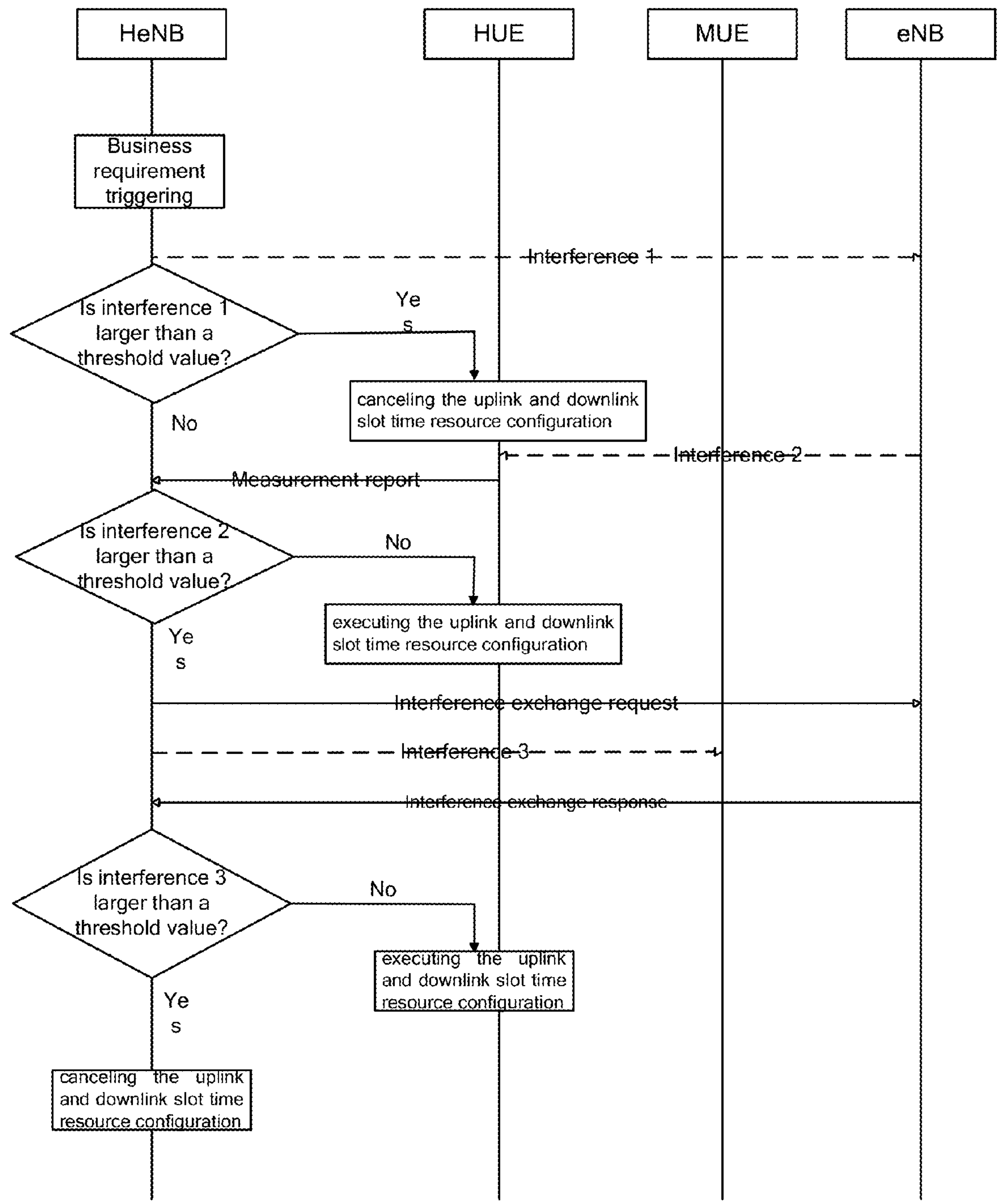
FIG. 7 is a schematic diagram of execution steps that the source base station is changed to downlink slot time resource configuration from uplink slot time resource configuration in the uplink and downlink slot time resource configuration method based on interference perception in a time division duplex system of the invention.

In scene 2 as shown in FIG. 6, HeNB is changed to downlink slot time resource configuration from uplink slot time resource configuration, wherein, HeNB is source base station, eNB is target base station, and the uplink and downlink slot time resource configuration method based on interference perception is executed according to execution steps as shown in FIG. 7:

S1, judging whether the interference of HeNB on eNB is larger than a preset threshold value or not, if yes, canceling the uplink and downlink slot time resource configuration, and if no, continuously executing S2, wherein HeNB performs interference prediction on adjacent cells according to interference information received in establishing process of ANR.

S2, judging the interference of eNB on HUE in HeNB, if the interference is smaller than a preset threshold value, executing the uplink and downlink slot time resource configuration; if no, continuously executing S3, wherein the step also comprises:

measuring the interference received from the eNb by HUE, and then reporting the received interference measurement to the HeNB; and judging the interference measurement report to eNB from HUE by HeNB, if the interference measured by HUE is smaller than a preset threshold value, executing the uplink and downlink slot time resource configuration by the HeNB; if the interference measured by HUE is not smaller than a preset threshold value, indicating that HUE is a cell edge user, thus sending an interference exchange request signaling to eNB from the HeNB, and notifying the eNB to start the interference measurement about MUE.

S3, judging whether the interference of HeNB on MUE in eNB is larger than a preset threshold value, if yes, canceling the uplink and downlink slot time resource configuration; if no, executing the uplink and downlink slot time resource configuration. The step also comprises:

after eNB receives the interference exchange request signaling, inspecting the interference measurement report of the user terminal in the cell, finding out the greatest interference information of MUE which is interfered by HeNB to the greatest extent, arranging the greatest interference information in the interference exchange response signaling to send back to HeNB;

inspecting the received interference exchange response signaling by HeNB, judging whether the greatest interference of HeNB on MUE is larger than a preset threshold value, if yes, indicating that HUE and MUE are both cell edge users, and HUE and MUE are adjacent users between different cells, and the interference of HUE on MUE is severer, thus canceling the uplink and downlink slot time resource configuration; otherwise, executing the uplink and downlink slot time resource configuration. The interference exchange request signaling and the interference exchange response signaling are used for estimating the interference between the user terminals. S2 and S3 are used for judging the terminal-to-terminal interference and different configurations of uplink and downlink slot time resources can be executed only when the terminal-to-terminal is judged to be small enough.

The uplink and downlink slot time resource configuration method based on interference perception in a time division duplex system realizes the uplink and downlink slot time resource configuration by the information interaction between the base stations, improves the system throughput capacity, reduces interference of edge users, ensures the maximal resource use ratio, reduces the signaling complexity and solves the problem of crossing slot time interference caused by the flexible configuration of uplink and downlink resources existing in the different network structures, and the invention is also suitable for both homogeneous network and heterogeneous network.

In conclusion, the invention effectively overcomes various defects in the prior art and has high industrial value in use.

The above mentioned embodiments demonstratively explain the principle and effects of the invention, and are not limitative of the invention. Any person familiar with the art can modify or change the embodiments without deviating the spirit and scope of the invention. Therefore, all equivalent modification or change which are finished by people with general knowledge without deviating from the spirit and technology thought in the technical field are still covered by claims of the invention.

What is claimed is:

1. An uplink and downlink slot time resource configuration method based on interference perception in a time division duplex system, which is applied to a communication network comprising a source base station, a target base station, as well as a user terminal in the source base station and a user terminal in the target base station, characterized in that, the uplink and downlink slot time resource configuration method comprises:

S1, judging interference 1, namely whether the interference between the source base station and the target base station is larger than a preset threshold value or not, if yes, canceling the uplink and downlink slot time resource configuration, and if no, continuously executing the next step;

S2, judging interference 2, namely, whether the interference measurement of the target base station on the user terminal in the source base station is larger than a preset threshold value or not, if no, executing the uplink and downlink slot time resource configuration; if yes, sending an interference exchange request signaling to the target base station from the source base station, and continuously executing the next step; and measuring the interference received from the target base station by the user terminal in the source base station, then reporting the received interference to the source base station; and judging whether the interference on the user terminal in the source base station from the target base station is larger than a preset threshold value or not, if no, executing the uplink and downlink slot time resource configuration, if yes, indicating that the user terminal in the source base station is a cell edge user, sending an interference exchange request signaling to the target base station by the source base station, and notifying the target base station to start the interference measurement of the user terminal in the target base station;

S3, after the target base station receives the interference exchange request signaling, inspecting the interference measurement of the user terminal in the target base station, finding out the interference information of the user terminal in the target base station which is interfered by the source base station to the greatest extent, arranging the greatest interference information in an interference exchange response signaling to send back to the source base station, inspecting the received interference exchange response signaling by the source base station, judging interference 3, namely, whether the interference measurement of the source base station on the user terminal in the target base station is larger than a preset threshold value or not, if yes, canceling the uplink and downlink slot time resource configuration, and if no, executing the uplink and downlink slot time resource configuration.

2. The uplink and downlink slot time resource configuration method according to claim 1, characterized in that: when the source base station is changed to uplink slot time resource configuration from downlink slot time resource configuration, the step S1 also comprises: estimating the interference of the target base station on the source base station by the source base station according to a reference signal receiving power measurement report per se.

3. The uplink and downlink slot time resource configuration method according to claim 1, characterized in that: when the source base station is changed to downlink slot time resource configuration from uplink slot time resource configuration, the step S1 also comprises: performing interference prediction of the source base station on adjacent cells by the source base station according to the interference information received in an establishing process of auto neighbor relationship.

4. The uplink and downlink slot time resource configuration method according to claim 1, characterized in that: the step S3 also comprises:

after the target base station receives the interference exchange request signaling, inspecting the interference measurement of the user terminal in the target base station, finding out the interference information of the user terminal in the target base station which is interfered by the source base station to the greatest extent, and arranging the greatest interference information in the interference exchange response signaling to send back to the source base station; and inspecting the received interference exchange response signaling by the source base station, judging whether the maximal interference of the source base station on the user terminal in the target base station is larger than a preset threshold value or not, if yes, indicating that the user terminal in the source base station and the user terminal in the target base station are both cell edge uses, the user terminal in the source base station and the user terminal in the target base station are adjacent users between different cells, and the interference of the user terminal in the source base station on the user terminal in the target base station is severer, thus canceling the uplink and downlink slot time resource configuration; if no, executing the uplink and downlink slot time resource configuration.

5. The uplink and downlink slot time resource configuration method according to claim 4, characterized in that: the interference exchange request signaling and the interference exchange response signaling are used for estimating the interference between the user terminals.

6. The uplink and downlink slot time resource configuration method according to claim 1, characterized in that: the source base station is a base station triggering the uplink and downlink reconfiguration, and the target base station is an interfered base station.

7. The uplink and downlink slot time resource configuration method according to claim 1, characterized in that: when at least one user terminal exists in the source base station, the user terminal is called as an edge user terminal and when the edge user terminal is severely interfered by the target base station, the source base station sends the interference exchange request signaling to the target base station.

8. The uplink and downlink slot time resource configuration method according to claim 7, characterized in that: the interference exchange request signaling has two options of: 1, marking whether a severely interfered user terminal exists in the target base station by an interference zone bit; and 2, notifying the target base station to feed back the maximal interference information from the source base station.

9. The uplink and downlink slot time resource configuration method according to claim 8, characterized in that: the target base station sends an interference exchange response signaling to the source base station according to the interference exchange request signaling option.

* * * * *